United States Patent
Day et al.

(10) Patent No.: US 8,201,173 B2
(45) Date of Patent: Jun. 12, 2012

(54) INTELLIGENT PRE-STARTED JOB AFFINITY FOR NON-UNIFORM MEMORY ACCESS COMPUTER SYSTEMS

(75) Inventors: Paul Reuben Day, Rochester, MN (US); Brian Robert Muras, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 1184 days.

(21) Appl. No.: 12/015,138

(22) Filed: Jan. 16, 2008

(65) Prior Publication Data
US 2009/0183156 A1    Jul. 16, 2009

(51) Int. Cl.
G06F 9/455        (2006.01)
G06F 9/46         (2006.01)
(52) U.S. Cl. ........................................................ 718/102
(58) Field of Classification Search .................... None
See application file for complete search history.

(56) References Cited

U.S. PATENT DOCUMENTS

| | | | |
|---|---|---|---|
| 7,448,037 B2 * | 11/2008 | Arimilli et al. | 718/104 |
| 7,882,399 B2 * | 2/2011 | Day et al. | 714/15 |
| 2004/0143833 A1 * | 7/2004 | Heyrman et al. | 718/100 |

OTHER PUBLICATIONS

Zhou et al.; Processor Pool-Based Scheduling for Large-Scale NUMA Multiprocessors; 1991; ACM.*
Funk, Mark, IBM eServer, "Enhanced eServer iSeries Performance Memory Affinity" (Jul. 2004), pp. 1-13.

* cited by examiner

*Primary Examiner* — Corey S Faherty
(74) *Attorney, Agent, or Firm* — Wood, Herron & Evans LLP

(57) ABSTRACT

A method, apparatus, and program product select a pre-started job from among a plurality of pre-started jobs in which to perform a task in a computer system with a NUMA configuration. An attempt to perform a task is received as a connection. Information associated with the connection is compared to information associated with a plurality of pre-started jobs. In response to comparing the information, it is determined either that a pre-started job was previously used to perform the task or that no pre-started job was previously used to perform the task. In response to either determination, another pre-started job is determined in which to perform the task. The other pre-started job is determined based on affinity with the task, and may be reallocated to perform the task.

21 Claims, 3 Drawing Sheets

INTELLIGENT PRE-STARTED JOB AFFINITY FOR NON-UNIFORM MEMORY ACCESS COMPUTER SYSTEMS

FIELD OF THE INVENTION

The present invention relates to computing systems, and more particularly to assigning tasks to jobs in a non-uniform memory access computer system.

BACKGROUND OF THE INVENTION

Modern tasks of a computer systems may require that a task, application, or process be started, run, and stopped hundreds of times. As a consequence, a computer system can quickly exhibit poor performance and suffer usage issues when it has to constantly recreate an environment in which to run the task. To alleviate this requirement pre-started jobs may be utilized.

A job is generally an execution path through an address space of a computer system. The job may be as simple as a set of program instructions loaded in memory or as complex as an instance of an application or program. A pre-started job is a job loaded from a storage device, such as a hard disk drive or electronic memory, active in memory and ready for immediate use. With a pre-started job the computer system can quickly process a task specific to that pre-started job without waiting for program load times, allocation of memory, configuration of the program, configuration of data, processor scheduling, or other overhead associated with starting the job from scratch. Generally speaking, pre-started jobs are active in memory in a "pool" and chosen by the computer system for a particular task. The management of pre-started jobs is known colloquially as "job pooling".

In a typical computer system, the processor, or central processing unit ("CPU"), is coupled to a multi-level memory architecture that includes a main memory typically implemented using Dynamic Random Access Memory (DRAM) solid state devices along with one or more smaller, faster Static Random Access Memory (SRAM) cache memories that are used to reduce the average time to access data by temporarily storing copies of data from the most frequently used portions of the main memory. Caches are often integrated onto the same processor chip as the CPU, and thus provide significantly faster performance than a main memory, which is generally external to the chip upon which the CPU is fabricated. When data required by the CPU is not present in a cache (i.e., there has been a cache "miss"), the main memory must be accessed to retrieve the data. Consequently, the performance of a computer is often dependent upon how often data used by a CPU needs to be retrieved from a slower main memory instead of accessed from a cache.

In a computer with a plurality of CPUs, a non-uniform memory access ("NUMA") configuration may be utilized to effectively distribute the main memory across multiple nodes. NUMA configurations originated from the need to provide the plurality of CPUs with sufficient memory without decreasing the performance or otherwise "starving" the plurality of CPUs with slow memory access. In a typical NUMA configuration at least one CPU, one or more CPU caches, and a portion of the main memory (e.g., a set of DRAM memory devices) are connected to a memory bus to form a "node." Typically, a plurality of nodes are connected by means of a high speed interconnect to form a NUMA configuration. The portion of the main memory resident on the same node as a CPU is typically considered to be the "local memory" for the CPU, while portions of main memory resident on other nodes are typically referred to as "remote memories" relative to the CPU.

In a computer system with a NUMA configuration (a "NUMA system"), a data access by the a CPU that is satisfied by the contents of a local CPU cache or a local memory is referred to as a "local node" access. Accordingly, a "remote node" access is typically an access satisfied by accessing data that is stored on a remote node. Data accesses to remote nodes are associated with a very high latency as compared to local node accesses. As such, NUMA systems are typically configured to "compartmentalize" processing to local nodes whenever possible.

Typically, when a pre-started job is utilized in a NUMA system, it follows that the pre-started job will execute faster if it is configured to perform the task on a local node with the data required for operation in a local CPU cache. Manual configuration of pre-started jobs to particular nodes is known in the art. In the typical manual configuration, the pre-started job is assigned to a node and may be referred to as a "local pre-started job" in reference to its node.

Upon a request for execution of a task, the NUMA system congruent with the prior art typically matches the task to a particular pre-started job and dispatches the task to the node with the particular pre-started job. In this way, a typical NUMA system that utilizes pre-started jobs assigns every task a "home node" with a "home" pre-started job. Upon a subsequent attempt to process the task, such a NUMA system typically attempts to assign that task to its home node and home pre-started job because the data for the task is already present on the home node. As such, the task will typically have affinity towards the node that it is assigned initially to run on. When the home pre-started job for the task is busy, the NUMA system will queue the task in its home node.

One downfall of the current art occurs when multiple pre-started jobs in different nodes require access to the same data. In that event, the local pre-started job in one node may not have data that is required for its associated task, causing data to be transferred from node to node. Transferring data from node to node results in severe latencies and a performance hit. This poses a distinct problem, as the performance hit for a NUMA system may be greater than the performance hit associated with access to data in a typical computer system. For example, suppose that there are three distinct queries, each operable to execute in different pre-started jobs, each pre-started job placed in a different node as per the current art, and two of the queries operate on the same data. The two pre-started jobs that require the same data will compete for access to the same data, resulting in a performance hit as the data is transferred from node to node.

Another downfall of the current art occurs when there are multiple task execution requests for a particular pre-started job. In that event, tasks in the queue for the particular pre-started job on the particular node will back up. If the tasks may be performed in other pre-started jobs, those other pre-started jobs may remain underutilized. Thus, there is currently no way to reconfigure the pre-started jobs to execute tasks more efficiently in a dynamic manner.

Consequently, there remains a need for selecting pre-started jobs to prevent performance impairments that may be caused by the transfer of data from one node to another in NUMA computer systems.

SUMMARY OF THE INVENTION

Embodiments of the invention provide for selecting a pre-started job from among a plurality of pre-started jobs to perform a task in a computer with a NUMA configuration appropriate for the task by determining which pre-started job displays affinity for performing the task.

In accordance with some embodiments of the invention, the selection process receives a connection that corresponds to an attempt to perform the task. Information associated with the connection is compared to information associated with the plurality of pre-started jobs. In response to this comparison, a first pre-started job is determined to have previously performed the task. In response to determining that the first pre-started job is busy, and therefore unavailable to perform the task, a second pre-started job is selected to perform the task.

In one embodiment, the second pre-started job is configured to perform on a processing node with data in a processing node memory that can be utilized to perform the task. In another embodiment, the first pre-started job is configured to perform on a first processing node and the second pre-started job is configured to perform on a second processing node.

In accordance with some embodiments of the invention, the selection process receives a connection that corresponds to an attempt to perform the task. Information associated with the connection is compared to information associated with the plurality of pre-started jobs. In response to this comparison, it is determined that none of the plurality of pre-started jobs were previously used to perform that task. In response to determining that none of the plurality of pre-started jobs were previously used to perform the task, a compatible pre-started job is determined in which to perform the task.

In one embodiment, the compatible pre-started job is configured to perform on a processing node with data in a processing node memory that can be utilized to perform the task. In another embodiment, the compatible pre-started job is a pre-started job that has been reallocated to perform the task.

In another embodiment, to compare the information associated with the connection and the information associated with the plurality of pre-started jobs, a connection signature is generated that corresponds to the connection. The connection signature is compared to the information associated with the plurality of pre-started jobs, which is stored in a job affinity table. Then, it is determined whether at least a subset of the connection signature corresponds to information associated with a pre-started job among the information associated with the plurality of pre-started jobs. The connection signature includes information associated with an application attempting to perform the task, information associated with a user attempting to perform the task, information associated with a computer attempting to perform the task, and/or information associated with data to be accessed by the task.

These and other advantages will be apparent in light of the following figures and detailed description.

BRIEF DESCRIPTION OF THE DRAWINGS

The accompanying drawings, which are incorporated in and constitute a part of this specification, illustrate embodiments of the invention and, together with a general description of the invention given above and the detailed description of the embodiments given below, serve to explain the principles of the invention.

DETAILED DESCRIPTION

Features of the present invention include a method, apparatus, and program product to select a pre-started job in which to perform a task for computer systems in non-uniform memory access ("NUMA") configurations by utilizing a job affinity algorithm. The job affinity algorithm utilized in the embodiments discussed hereinafter generates a signature of the task and dispatches the task to an appropriate pre-started job on an appropriate processing node. Information about each pre-started job and their corresponding location may be stored in a job affinity entry in a job affinity table. Upon a subsequent attempt to run the task, one embodiment of the job affinity algorithm dispatches the task to the appropriate pre-started job based on the stored information.

When the task signature matches the information in a job affinity entry that corresponds to a pre-started job, the task may be executed in that pre-started job. When the task signature does not completely match the information in a job affinity entry that corresponds to a pre-started job, the task may be executed in a pre-started job whose job affinity entry displays affinity for the task signature. If there is no matching job affinity entry or job affinity entry that displays affinity with the task signature, the task may be executed in a pre-started job that is re-allocated to the task. Affinity may be determined by matching a subset, or part, of the task signature to a subset, or part, of the affinity entry stored for each pre-started job.

Hardware Environment

Figure 1:
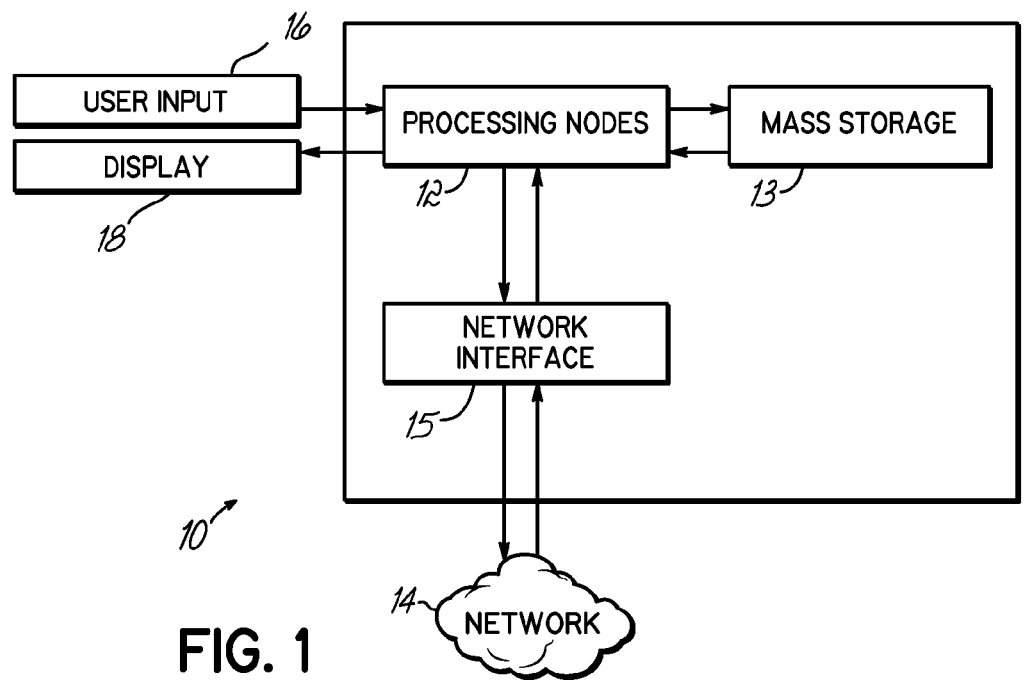
FIG. 1 is an exemplary hardware and software environment for a computing device suitable for implementing intelligent pre-started job affinity for NUMA configurations consistent with the invention.

Turning to the drawings, wherein like numbers denote like parts throughout the several views, FIG. 1 illustrates an exemplary hardware and software environment for a computing device 10 in a NUMA configuration suitable for implementing pre-started job affinity consistent with an embodiment of the invention. Computing device 10 may be a computer, computer system, server, disk array, or programmable device such as a multi-user computer, a single-user computer, a handheld device, a networked device, a mobile phone, a gaming system, etc. Computing device 10 will be referred to as "NUMA system" for the sake of brevity.

NUMA system 10 includes a plurality of processing nodes (shown generally at block 12) coupled to a mass storage device 13. Mass storage may also be accessible by NUMA system 10 over a network 14, e.g., via a storage area network (SAN).

Network 14 can be an internal network of computers connected by communications wires, a network of computers connected wirelessly, or a worldwide publicly accessible series of interconnected computer networks such as the Internet. Network 14 is coupled to the processing nodes 12 of NUMA system 10 through a network interface 15.

Coupled to NUMA system 10 is a user input 16 operable by a user, operator, or administrator of a NUMA system 10. Also coupled to NUMA system 10 is a display 18 (e.g., a CRT monitor, an LCD display panel, etc.). The interface to NUMA system 10 may also be through an external terminal connected directly or remotely to computer, or through another computer communicating with NUMA system 10 by way of network 14, modem, or other type of communications.

Figure 2:
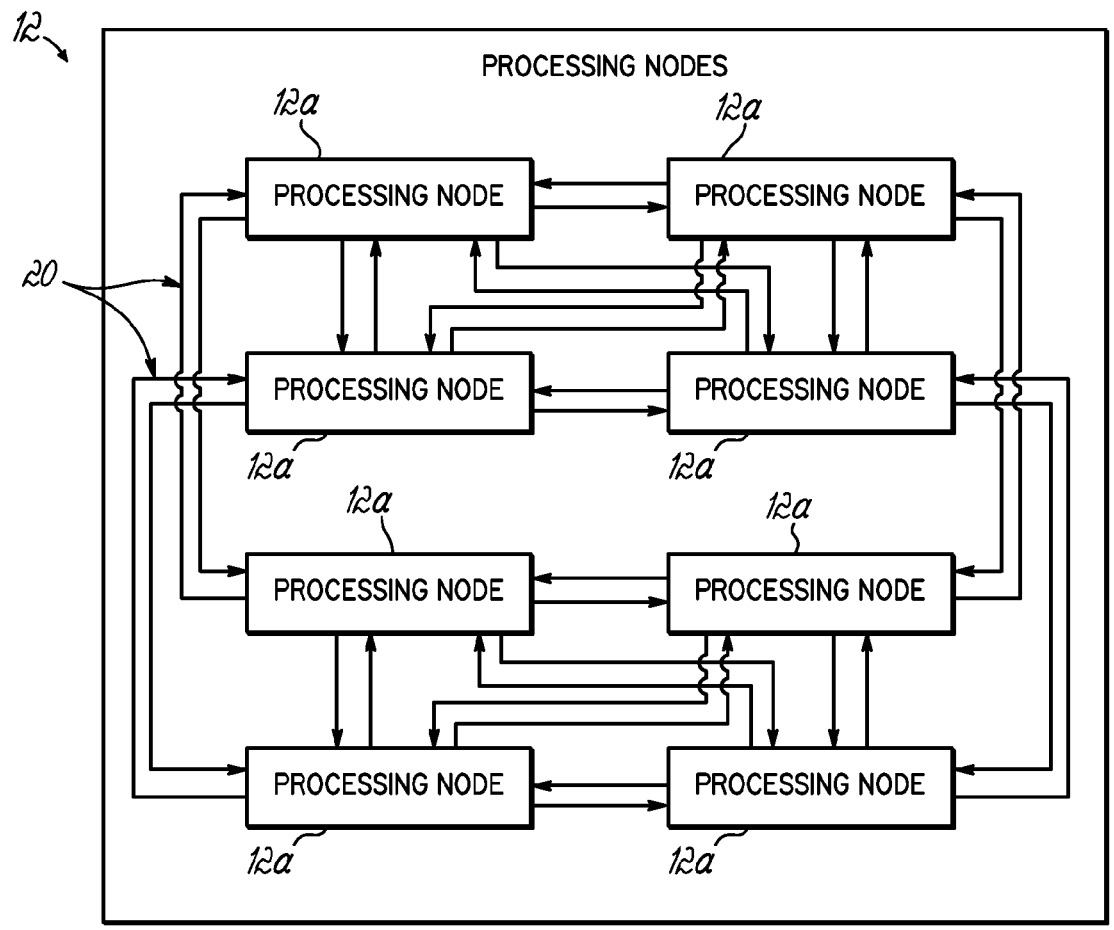
FIG. 2 is a diagrammatic illustration of an exemplary implementation of a NUMA configuration showing processing nodes and interconnections suitable for being utilized by the computing device of FIG. 1.

FIG. 2 is an illustration of the NUMA configuration utilized by the processing nodes 12 of FIG. 1 and suitable for implementing intelligent pre-started job affinity consistent with embodiments of the invention. In FIG. 2, there is illustrated one embodiment of a NUMA configuration in which individual processing nodes 12a are grouped in two sets of four. Each processing node 12a may communicate with other processing nodes 12a in the group as required by way of a high speed interconnect 20. Further, each processing node 12a may communicate with every other processing node 12a through particular processing nodes 12a. In alternate embodiments, each processing node 12a may be interconnected to every other processing node 12a. It will be appreciated that the illustration of the specific NUMA configuration of FIG. 2 is merely exemplary in nature, and that any combination and arrangement of processing nodes may be configured, as long as there is more than one processing node. For instance, it will be appreciated by one skilled in the art that in some implementations there will be more or fewer processing nodes to implement the pre-started job affinity consistent with embodiments of the invention.

Figure 3:
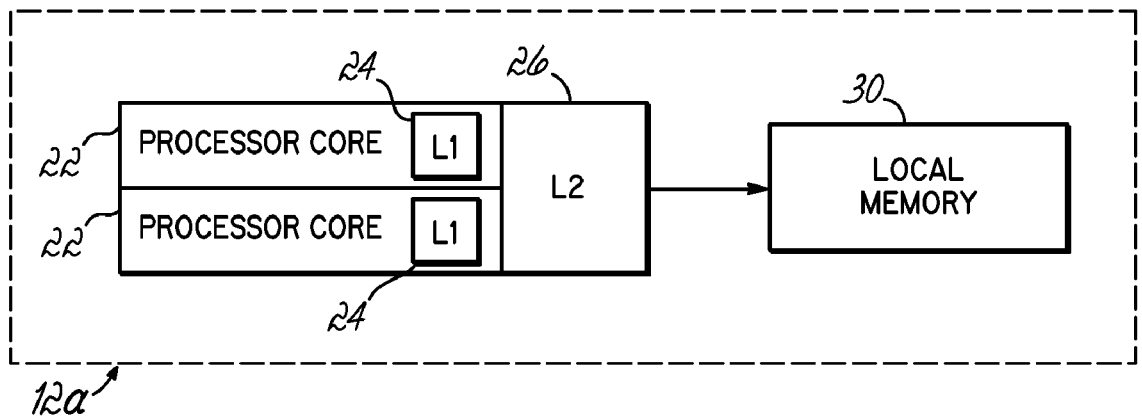
FIG. 3 is a diagrammatic illustration of an exemplary implementation of a processing node suitable for being utilized by the NUMA configuration of FIG. 2 and the computing device of FIG. 1.

FIG. 3 is a diagrammatic illustration of the circuit layout of each processing node 12a utilized by the NUMA configuration illustrated in FIG. 2 and suitable for implementing intelligent pre-started job affinity consistent with an embodiment of the invention. In the illustrated embodiment, processing node 12a includes two processors 22. Each processor 22 includes a processor core integrated with a Level 1 instruction and data cache ("L1 cache") 24, and in some embodiments, processors 22 may be integrated onto the same chip in a multi-core configuration. A processor 22 executes fastest when the accessed data, instruction stream, or a pre-started job is present in the L1 cache 24. In the event that an instruction stream, pre-started job, or needed data is not present in the L1 cache 24, the processor 22 may wait for a number of cycles while the data is loaded into the respective L1 cache 24 from a lower level cache memory, e.g., a Level 2 instruction and data cache ("L2 cache") 26 in electrical communication with the processor 22. The L2 cache 26 is considerably larger than the L1 cache 24, and may be integrated onto the same chip as a processor 22, or disposed externally thereto.

The processing node 12a consistent with embodiments of the invention may further support a local memory 30 in electrical communication with the L2 cache 26. The local memory 30 is considerably larger than any of caches 24, 26, and is typically implemented using DRAM solid state memory devices. The local memory also has a considerably longer access latency than any of caches 24, 26, so cache misses to any of the caches results in a performance penalty being incurred for having to access the local memory. The contents of the L2 cache 26 are called "store-in caches" since a change to a block of data can be held indefinitely before being finally written out to local memory 30.

Local memory 30 represents a portion of a distributed NUMA main memory, where the main memory is distributed among the local memories for all of the nodes in the system. Non-uniform memory access results in this configuration because when an instruction stream, pre-started job, or needed data is not present in any cache or local memory in of a processing node 12a that has requested that data, the data must be transferred from another processing node 12a. While a high speed interconnect 20 exists between nodes, the latency is considerably higher than the access latency from the local node, so remote node accesses can result in a significant performance penalty.

In one embodiment, each pre-started job is active in a local memory of a particular processing node 12a. In this way, data associated with pre-started jobs may be loaded and readily available in the L1 cache 24, L2 cache 26, and/or local memory 30 of the processing node 12a in which the pre-started job is active. Dispatching a task to a pre-started job that has appropriate data available for processing increases the speed at which the task is executed. In this way, the data does not have to be transferred from another processing node 12a. In the NUMA system 10 consistent with embodiments of the invention and shown generally in FIGS. 1 and 2, the task may be executed in the pre-started job for which there is an affinity, increasing the speed at which the task is processed.

It will be appreciated that the illustration of the processing node 12a of FIG. 3 is merely exemplary in nature, and that any combination and arrangement of processors 22, L1 caches 24, L2 caches 26, local memories 30, and other memory may be configured. For instance, it will be appreciated by one skilled in the art that in alternate implementations of a processing node 12a there may be only one processor 22 and L1 cache 24 in each processing node 12a, while in other embodiments there may be more processors 22 and L1 caches 24 to implement the pre-started job affinity consistent with an embodiment of the invention. Processors 22 may also include any number of processing cores. Similarly, it will be appreciated by one skilled in the art that in alternate implementations of each processing node 12a there may be more than one L1 cache 24, L2 cache 26, or local memory 30, as well as additional caches that may act as Level 3 caches.

Software Environment

Figure 4:
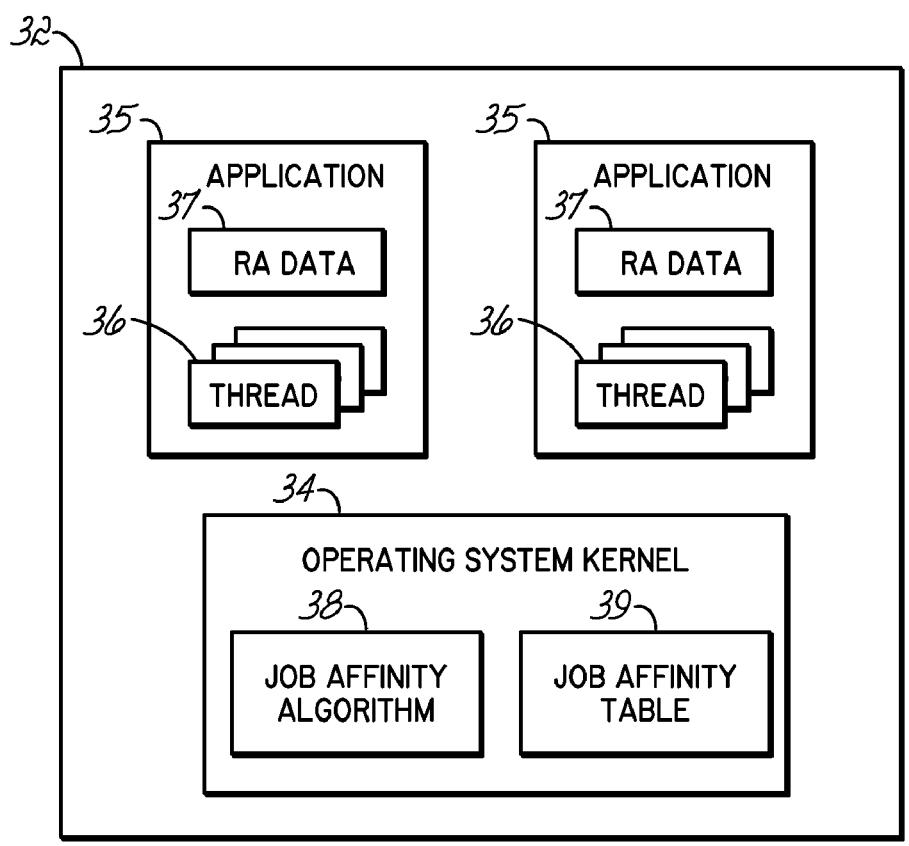
FIG. 4 is a diagrammatic illustration of an exemplary implementation of a software architecture suitable for being utilized by the computer device of FIG. 1.

FIG. 4 illustrates an exemplary software architecture 32 capable of being utilized by the NUMA system 10 of FIG. 1. Returning to FIG. 4, an operating system or kernel 34 controls the operations of NUMA system 10 and executes a plurality of application programs 35. Each application program 34 typically executes using one or more threads 36 to perform a task. Consistent with the invention, resource allocation (RA) data 37 is defined for each application program 35. The RA data 37 may be represented in a number of manners. For example, RA data may be defined in an application program using one or more variables, constants, or other data structures. In the alternative, the RA data may simply be inherently defined in the program code in the application program.

The allocation of tasks to threads is managed by the operating system 34. Typically, the operating system 34 dispatches the various tasks requested for execution to the threads 36. Tasks may be requested by the user of the NUMA system 10, the processing nodes 12, the operating system 34, or another computer communicating with NUMA system 10 through the network 14. The threads 36 are typically loaded with jobs. A job is generally an execution path through the address space of the NUMA system, and may be single instance of an application or program specifically assigned to perform the task. The operating system 34 may select the job to execute a task using a job affinity algorithm 38 in conjunction with a job affinity table 39. In particular, the operating system 34 may utilize pre-started jobs. Pre-started jobs are jobs which have previously been created to perform a particular task, active in the processing nodes 12, and do not have to be loaded or started. Pre-started jobs are useful when there is a need to perform a specific task or tasks a large number of times. The pre-started jobs may be associated with particular processing nodes and enable quick access and execution of a task by the operating system 34 and processing nodes 12.

In general, the routines to implement the embodiments of the invention, whether implemented as part of an operating system or a specific application, component, algorithm, job affinity algorithm, object, module, program, or sequence of instructions will be referred to herein as "computer program code" or simply "program code." The program code typically comprises one or more instructions that are resident at various times in memory and storage devices in a computer. When read and executed by a processor in a computer, the program code causes the computer to perform the steps necessary to execute steps or elements embodying the various aspects of the invention. Moreover, while the invention has and hereinafter will be described in the context of fully functioning computers and computer systems, those skilled in the art will appreciate that the various embodiments of the invention are capable of being distributed as a program product in a variety of forms, and that the invention applies regardless of the particular type of computer readable media used to actually carry out the invention. Examples of computer readable media include, but are not limited to, recordable type media such as volatile and non-volatile memory devices, floppy and other removable disks, hard disk drives, tape drives, optical disks (e.g., CD-ROM's, DVD's, HD-DVD's, Blu-Ray Discs), among others, and transmission type media such as digital and analog communications links.

In addition, various program code described hereinafter may be identified based upon the application or software component within which it is implemented in specific embodiments of the invention. However, it should be appreciated that any particular program nomenclature that follows is merely for convenience, and thus the invention should not be limited to use solely in any specific application identified and/or implied by such nomenclature. Furthermore, given the typically endless number of manners in which computer programs may be organized into routines, procedures, methods, modules, objects, and the like, as well as the various manners in which program functionality may be allocated among various software layers that are resident within a typical computer (e.g., operating systems, libraries, application programming interfaces ("APIs"), applications, applets, logical partitions, etc.), it should be appreciated that the invention is not limited to the specific organization and allocation of program functionality described herein.

Those skilled in the art will recognize that the exemplary environments illustrated in FIG. 1, FIG. 2, FIG. 3, and FIG. 4 are not intended to limit the present invention. Indeed, those skilled in the art will recognize that other alternative hardware and/or software environments may be used without departing from the scope of the invention.

Job Affinity Algorithm

Figure 5:
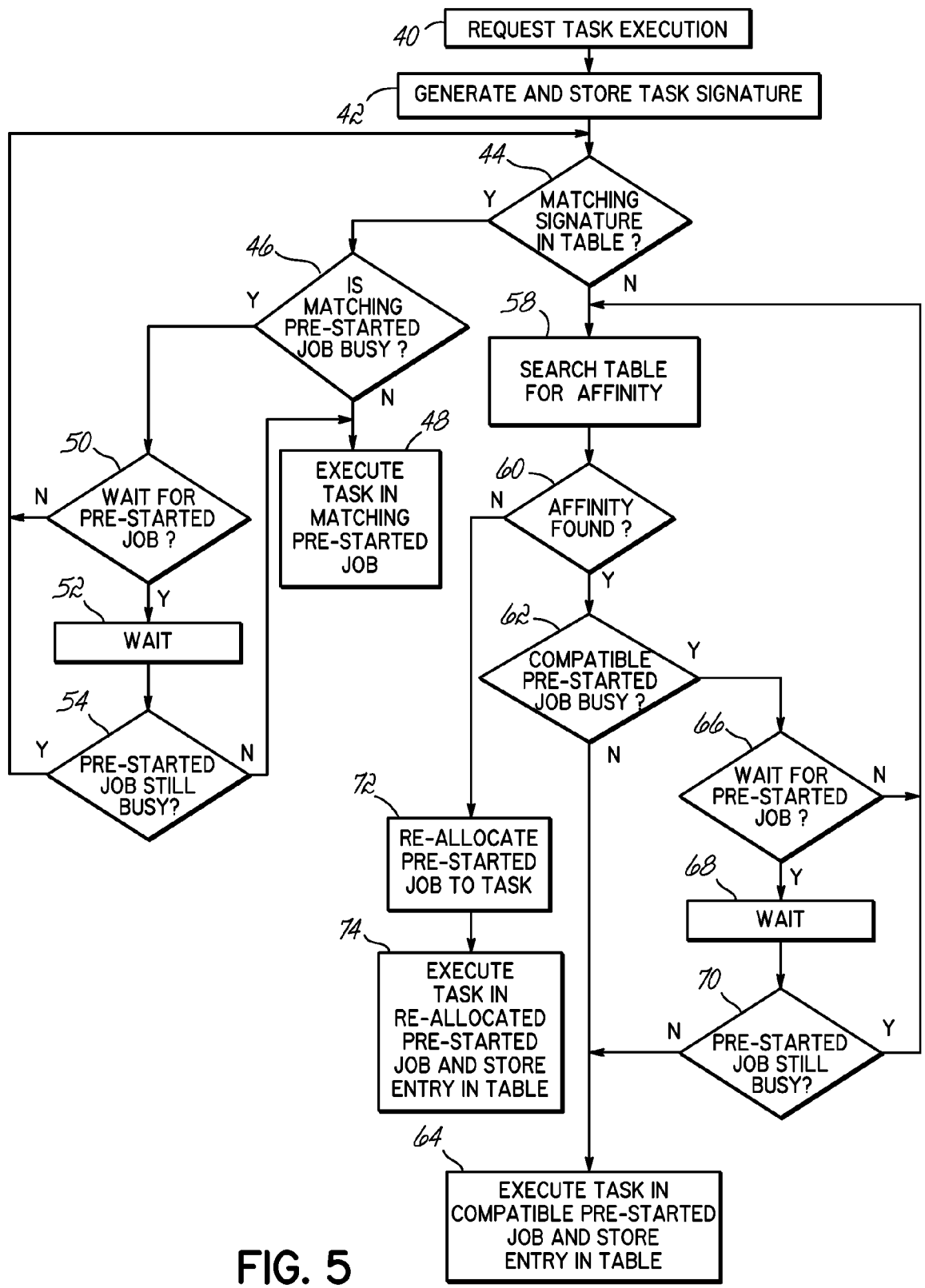
FIG. 5 is a flowchart illustrating one exemplary implementation of a job affinity algorithm suitable for being performed by the computing device of FIG. 1.

To perform a task, the NUMA system 10, consistent with embodiments of the invention, utilizes the job affinity algorithm 38 (hereafter, "program code") to select an appropriate pre-started job in which to perform the task. FIG. 5 illustrates a flowchart for one job affinity algorithm consistent with the invention. In block 40, the program code initially receives a request to process a task. The request may be initiated by the user input 16, another computer communicably coupled to NUMA system 10 through the network 14, the operating system 34, another task, another job, or otherwise from NUMA system 10. In some embodiments, the request may be forwarded through a connection to NUMA system 10 from another computer across the network 14. In block 42, the program code generates and stores a signature corresponding to the requested task ("connection signature" or "task signature"). The task signature may include information identifying an application attempting to perform the task, information identifying data that is to be accessed by the task, information identifying a computer attempting to perform the task, and/or information identifying an individual attempting to perform the task. The individual may be a user of the NUMA system 10, a user of another computer requesting task execution across a network 14, or a TCP/IP address. The task signature may be stored in a cache (L1, L2) 24, 26, or in a local memory 30 at any given time, or may be stored in non-volatile memory such as a mass storage device.

In block 44, the program code determines whether there is data in at least one job affinity entry of the job affinity table 39 that matches the task signature. The job affinity table 39 may contain at least one job affinity entry (hereafter, "affinity entry") that corresponds to pre-started jobs. For example, the affinity entry may contain data associated with a pre-started job, including data that corresponds to the task signature of the last task that was processed by a pre-started job and the location of that particular pre-started job. The location of the pre-started job is a particular processing node 12a. In one embodiment, the signature of the task generated in block 42 and the signature of the affinity entry match when both the information associated with a user (i.e., a user or administrator utilizing NUMA system 10) requesting the task and the information associated with data to be accessed by the task match.

When the program code determines that the task signature matches an affinity entry in block 44, the program code resolves to the pre-started job indicated in the affinity entry that matches the task signature (i.e., a "matching pre-started job") and determines whether the matching pre-started job is busy in block 46. Typically, the matching pre-started job is configured to perform on a processing node 12a with data appropriate for the task configured in a cache (L1, L2) 24, 26 or local memory 30 of the processing node 12a.

In block 46, the program code determines whether the matching pre-started job is busy. In block 48, the program code dispatches the task to the appropriate processing node to be executed in the matching pre-started job and delete the task signature generated in block 42 when the matching pre-started job is not busy. Also in block 48, the task signature generated in block 42 is removed.

Returning to block 46, when the matching pre-started job is busy, the program code determines whether the task should wait for the matching pre-started job in block 50. The decision of whether to wait for the matching pre-started job may be configured by the user or administrator of the NUMA system 10. When the program code determines that it should wait for the matching pre-started job in block 50, the program code waits for a predetermined amount of time in block 52. The predetermined amount of time may be configured by the user or administrator of the NUMA system 10. In block 54, the program code determines whether the matching pre-started job is still busy. When the program code determines that the matching pre-started job is no longer busy, the task executes in the matching pre-started job in block 48.

When the program code determines that the task should not wait for the matching pre-started job to complete in block 50, or when the program code determines the matching pre-started job is still busy in block 54, the program code proceeds back to block 44 to determine if there is another matching pre-started job for the task. If there is another matching pre-started job, the program code again continues to block 46. In this way, the program code may determine all matching pre-started jobs for the task, then determine whether they are all busy.

Referring back to block 44, when there is no matching signature in the job affinity table 39, or when all matching pre-started jobs are busy, the program code searches through the job affinity table 39 for pre-started jobs that have affinity with the task or are otherwise compatible to perform the task ("compatible pre-started jobs"). In this way, the job affinity algorithm 38 consistent with embodiments of the invention will attempt to match the task with the pre-started job that may already have files, database tables, indexes, applications, system code, or other data relevant to execution of the task resident in the local memory (e.g., data that has not paged out of the L1 cache 24, L2 cache 26, or local memory 30).

Consistent with one embodiment of the invention, the program code searches the job affinity table 39 for some part, or subset, of the task signature that corresponds to some part, or subset, of the affinity entries in block 58. In this way, the program code consistent with embodiments of the invention may attempt to match the task with a pre-started job associated with similar data access. When there is data access affinity, the pre-started job associated with similar data access may be appropriate for executing the task due to the corresponding data access requested by the task. As such, the "compatible" pre-started job may have data relevant to execution of the task residing in the local memory. In block 60, the program code determines whether there is data access affinity.

When data access affinity is found in block 60, the program code proceeds to block 62. In block 62, the program code determines whether the compatible pre-started job is busy. In block 64, the program code dispatches the task to the compatible processing node to be executed in the compatible pre-started job and delete the task signature generated in block 42 when the compatible pre-started job is not busy. In block 64, an affinity entry is also stored in the job affinity table 39 corresponding to the signature of the compatible pre-started job and its location. The entry indicates the specific compatible pre-started job such that the task attempts to reuse the compatible pre-started job upon a subsequent attempt to perform the task. Also in block 64, the task signature generated in block 42 may be removed.

Returning back to block 62, when the compatible pre-started job is busy, the program code determines whether the task should wait for the compatible pre-started job to complete in block 66. The decision of whether to wait for the compatible pre-started job may be configured by the user or administrator of the NUMA system 10. When the program code determines that it should wait for the compatible pre-started job in block 66, the program code waits for a predetermined amount of time in block 68. The predetermined amount of time may be configured by the user or administrator of the NUMA system 10. In block 70, the program code determines whether the compatible pre-started job is still busy. When the program code determines that the compatible pre-started job is no longer busy, the task executes in the compatible pre-started job in block 64.

When the program code determines that the task should not wait for the compatible pre-started job to complete in block 66, or when the program code determines the compatible pre-started job is still busy in block 70, the program code proceeds back to block 54 to determine if there is another compatible pre-started job for the task. If there is another compatible pre-started job, the program code again continues to block 62. In this way, the program code may determine all compatible pre-started jobs for the task, then determine whether they are all busy.

Returning to block 60, when there is no application affinity determined, or when all compatible pre-started jobs are busy, the program code proceeds to block 72. In block 72, the program code re-allocates a pre-started job to execute the task. In one embodiment, the program code re-allocates the pre-started job that is least accessed by other tasks. In another embodiment, the program code re-allocates the pre-started job that has been active the longest. In another embodiment, the program code re-allocates the pre-started job that is least accessed and has been active the longest. In this way, the program code is operable to reallocate resources across the NUMA system 10 dynamically and in response to changing task requests.

In one embodiment, re-allocation of a pre-started job may involve substantially terminating the pre-started job and loading a new pre-started job in its place. For example, a pre-started job on a first processing node 12a is substantially terminated and the data associated with that substantially terminated pre-started job may be removed. Following this, a pre-started job and data appropriate for the task are loaded onto the first processing node 12a. In alternate embodiments, re-allocation of a pre-started job may involve transferring the reallocated pre-started job to a second processing node 12a. For example, a pre-started job on a first processing node is substantially terminated and the data associated with that substantially terminated pre-started job may be removed. Following this, a pre-started job and data appropriate for the task are loaded onto a second processing node. In the alternate embodiments, re-allocation to the second processing node may be useful when there are pre-started jobs on the second processing node that utilize some data requested by the task, but do not utilize all data requested by the task. In alternate embodiments, re-allocation to the second processing node may improve efficiency by keeping data relevant to pre-started jobs on one processing node and preventing latency due to data being transferred between the processing nodes 12.

In block 74, the task is dispatched and executed in the re-allocated pre-started job and an entry is stored in the job affinity table 39 corresponding to the signature of the re-allocated pre-started job and its location. The entry indicates the specific re-allocated pre-started job such that the task will attempt to reuse the re-allocated pre-started job upon a subsequent attempt to perform the task. Also in block 74, the task signature generated in block 42 may be removed.

Further details and embodiments of the present invention will be described by way of the following examples.

Example 1

By way of example, suppose that a NUMA system 10 consistent with embodiments of the invention has one-thousand users with three main applications. After some time, and particularly after undergoing the process of FIG. 5 consistent with embodiments of the invention, the three applications will each have a certain set of pre-started jobs. Suppose there is an even spread of pre-started jobs across the three applications being executed by one thousand users on a first day (e.g., there are 1000 pre-started jobs for each application and approximately 333 users for each application). Further, assume that each pre-started job is allocated to a specific processing node 12a in the NUMA system 10. The next day, there are 800 users utilizing Application 1, 198 users utilizing Application 2, and 2 users utilizing Application 3. In a NUMA system 10 consistent with embodiments of the invention, the pre-started jobs can be easily adjusted to balance the load across the pre-started jobs and processing nodes 12. In this example, the program code will reassign pre-started jobs such that Application 1 is assigned 2400 pre-started jobs, Application 2 is assigned 396 pre-started jobs, and Application 3 is assigned six pre-started jobs. Also in this example, the pre-started jobs will be assigned evenly across the processing nodes 12, preventing a particular processing node 12a from being overwhelmed with execution requests even though data accessed by pre-started jobs may be the same.

Additionally, allowances may be made for scenarios during startup or where the system may be re-started or after all the pre-selected jobs are cancelled where the job affinity table is initially empty. Suppose Application 1 is the first application requesting tasks, and early in the morning all 3000 pre-started jobs are assigned to tasks from Application 1. Later in the day, Application 2 begins to need pre-started jobs. Allowances are made for re-allocation of pre-started jobs from Application 1 to Application 2 when the total number of pre-started jobs is restricted. Even later in the day, Application 3 begins to need pre-started jobs. Allowances are made for re-allocation of pre-started jobs from Application 2 to Application 3 when the total number of pre-started jobs is restricted. In this way, the job affinity algorithm 38 consistent with embodiments invention re-allocates the oldest pre-started job from one application to another application.

Example 2

By way of example, suppose that the NUMA system 10 consistent with embodiments of the invention has multiple users and eight pre-started jobs, some of which are assigned to specific applications, each assigned to a processing node as shown in Table 1 below.

TABLE 1

| Application | Pre-Started Job | Processing Node |
|---|---|---|
| App1 | j1 | N1 |
|  | j2 | N1 |
| App2 | j3 | N2 |
|  | j4 | N2 |
| App3 | j5 | N3 |
| Administration | j6 | N4 |
| Free Pool | j7 | N5 |
|  | j8 | N6 |

As disclosed, j1 and j2, which are assigned to App1, are both assigned to processing node N1. In this way, data associated with j1 and j2 may be accessed quickly on the same processing node. Similarly, j3 and j4, assigned to App2, are both assigned to processing node N2. By way of example, when users access the NUMA system 10 for execution of tasks, the pre-started jobs may be re-allocated to the applications and processing nodes as shown in Table 2 below.

TABLE 2

| User | Pre-Started Job | Effect |
|---|---|---|
| User1 - Connection1 - App1 | j1, j2 | j1 and j2 remain on N1 |
| User1 - Connection2 - App2 | j3 | j3 remains on N2 |
| User2 - Connection1 - App2 | j4 | j4 remains on N2 |
| User3 - Connection1 - App3 | j5 | j5 remains on N3 |
| Administrator - Connection1 | j6 | j6 remains on N4 |
| User4 - Connection1 - App2 | j7 | j7 re-allocated to App2 and N2 |

As disclosed, j7 has been re-allocated from the free pool to App2 in a manner consistent with some embodiments of the invention. Furthermore, j7 has been moved from N5 to N2 to benefit from the data that may be shared by j3 and j4 on N2 in a manner consistent with some embodiments of the invention.

While the present invention has been illustrated by a description of the various embodiments and the examples, and while these embodiments have been described in considerable detail, it is not the intention of the applicants to restrict or in any way limit the scope of the appended claims to such detail. Additional advantages and modifications will readily appear to those skilled in the art. Thus, the invention in its broader aspects is therefore not limited to the specific details, representative apparatus and method, and illustrative example shown and described. In particular, the invention in its broader aspects is not limited to determining task and pre-started job affinity by determining application and data access affinity. The invention in its broader aspects may determine task and pre-started job affinity through the use or one or more parameters. Further, other parameters for affinity may include a particular type of data affinity (affinity of a pre-started job with a particular type of data, such as a particular table, database, file, index, or other data), user affinity (affinity of a pre-started job with a task from a particular user), application affinity (affinity of a pre-started job with a task from a particular application or program), computer affinity (affinity of a pre-started job with a task from a particular computer), network affinity (affinity of a pre-started job with a task from a particular network), device affinity (affinity of a pre-started job with a task from a particular device), operation affinity (affinity of a pre-started job with a task from a particular operation), alert/alarm affinity (affinity of a pre-started job with a task from a particular alert/alarm), and/or another type of affinity that will readily appear to those skilled in the art. Accordingly, departures may be made from such details without departing from the spirit or scope of applicants' general inventive concept.

What is claimed is:

1. A method of selecting a pre-started job from among a plurality of pre-started jobs in which to perform a task in a non-uniform access computer system, the method comprising:

receiving a connection corresponding to an attempt to perform the task;

comparing information associated with the connection to information associated with the plurality of pre-started jobs;

in response to comparing the information associated with the connection to the information associated with the plurality of pre-started jobs, determining a first pre-started job from among the plurality of pre-started jobs that was previously used to perform the task; and in response to determining that the first pre-started job that was previously used to perform the task is busy, selecting a second pre-started job from among the plurality of pre-started jobs in which to perform the task, wherein comparing the information associated with the connection to the information associated with the plurality of pre-started jobs further comprises:

generating a connection signature that corresponds to the connection;

comparing the connection signature to the information associated with the plurality of pre-started jobs, wherein the information associated with the plurality of pre-started jobs is stored in a job affinity table, and wherein comparing the connection signature to the information associated with the plurality of pre-started jobs includes accessing the job affinity table to obtain the information associated with the plurality of pre-started jobs; and determining whether at least a subset of the connection signature corresponds to information associated with a pre-started job among the information associated with the plurality of pre-started jobs.

2. The method of claim 1, wherein the connection signature includes information identifying data to be accessed by the task, and wherein determining whether at least a subset of the connection signature corresponds to information associated with a pre-started job includes comparing the identified data for the connection signature with data identified in the information associated with the pre-started job.

3. The method of claim 1, wherein the connection signature includes information selected from the group consisting of information identifying data types to be accessed by the task, information identifying a user from which the task is requested, information identifying an application from which the task is requested, information identifying another computer system from which the task is requested, information identifying a network from which the task is requested, information identifying a device from which the task is requested, information identifying a computing operation for which the task is to perform, information identifying an alert that induces the task, and information identifying an alarm that induces the task, and wherein determining whether at least a subset of the connection signature corresponds to information associated with a pre-started job includes comparing the identified data for the connection signature with data identified in the information associated with the pre-started job.

4. The method of claim 1, wherein selecting the second pre-started job is performed based at least in part on the length of time the second pre-started job has been performing tasks on the computer system.

5. The method of claim 1, wherein selecting the second pre-started job is performed based at least in part on the number of times the second pre-started job has been accessed to perform tasks on the computer system.

6. The method of claim 1, wherein selecting the second pre-started job is performed based at least in part on the second pre-started job being configured to execute on a processing node with data in a processing node memory that can be utilized to perform the task.

7. The method of claim 1, wherein the first pre-started job is configured to execute on a first processing node and the second pre-started job is configured to execute on a second processing node.

8. A method of selecting a pre-started job from among a plurality of pre-started jobs in which to perform a task in a non-uniform access computer system including a plurality of processing nodes, the plurality of pre-started jobs loaded into a plurality of threads executing on at least one processing node of the computer system, the method comprising:

receiving a connection corresponding to an attempt to perform the task;

comparing information associated with the connection to information associated with the plurality of pre-started jobs;

in response to comparing the information associated with the connection to the information associated with the plurality of pre-started jobs, determining that none of the plurality of pre-started jobs were previously used to perform the task;

in response to determining that none of the plurality of pre-started jobs were previously used to perform the task, selecting a compatible pre-started job from among the plurality of pre-started jobs in which to perform the task; and in response to selecting the compatible pre-started job, dispatching the task to a thread loaded with the compatible pre-started job for execution by the compatible pre-started job;

wherein comparing the information associated with the connection to the information associated with the plurality of pre-started jobs further comprises:

generating a connection signature that corresponds to the connection;

comparing the connection signature to the information associated with the plurality of pre-started jobs, wherein the information associated with the plurality of pre-started jobs is stored in a job affinity table, and wherein comparing the connection signature to the information associated with the plurality of pre-started jobs includes accessing the job affinity table to obtain the information associated with the plurality of pre-started jobs; and determining whether at least a subset of the connection signature corresponds to information associated with a pre-started job among the information associated with the plurality of pre-started jobs.

9. The method of claim 8, wherein the connection signature includes information identifying data to be accessed by the task, and wherein determining whether at least a subset of the connection signature corresponds to information associated with a pre-started job includes comparing the identified data for the connection signature with data identified in the information associated with the pre-started job.

10. The method of claim 8, wherein the connection signature includes information selected from the group consisting of information identifying data types to be accessed by the task, information identifying a user from which the task is requested, information identifying an application from which the task is requested, information identifying another computer system from which the task is requested, information identifying a network from which the task is requested, information identifying a device from which the task is requested, information identifying a computing operation for which the task is to perform, information identifying an alert that induces the task, and information identifying an alarm that induces the task, and wherein determining whether at least a subset of the connection signature corresponds to information associated with a pre-started job includes comparing the identified data for the connection signature with data identified in the information associated with the pre-started job.

11. The method of claim 8, wherein selecting the compatible pre-started job is performed based at least in part on the length of time the compatible pre-started job has been performing tasks on the computer system.

12. The method of claim 8, wherein selecting the compatible pre-started job is performed based at least in part on the number of times the compatible pre-started job has been accessed to perform tasks on the computer system.

13. The method of claim 8, wherein selecting the compatible pre-started job is performed based at least in part on the second pre-started job being configured to execute on a processing node with data in a processing node memory that can be utilized to perform the task.

14. The method of claim 8, wherein the compatible pre-started job is a pre-started job that has been reallocated to perform the task.

15. An apparatus comprising:
a plurality of processing nodes coupled together in a non-uniform memory access configuration, each processing node comprising:
at least one processor;
at least one local memory; and
program code configured to be executed by at least a subset of the plurality of processing nodes to receive a connection corresponding to an attempt to perform a task, compare information associated with the connection to information associated with a plurality of pre-started jobs loaded into a plurality of threads executing on at least one of the processing nodes of the plurality of processing nodes, determine that none of the plurality of pre-started jobs were previously used to perform the task in response to comparing the information associated with the connection to the information associated with the plurality of pre-started jobs, determine a compatible pre-started job from among the plurality of pre-started jobs in which to perform the task in response to determining that none of the plurality of pre-started jobs were previously used to perform the task, and dispatch the task to a thread loaded with the compatible pre-started job for execution by the compatible pre-started job in response to selecting the compatible pre-started job, wherein the program code is further configured to generate a connection signature that corresponds to the connection, compare the connection signature to the information associated with the plurality of pre-started jobs, and determine whether at least a subset of the connection signature corresponds to information associated with a pre-started job among the information associated with the plurality of pre-started jobs.

16. The apparatus of claim 15, wherein the program code is further configured to store information about the plurality of pre-started jobs in a job affinity table.

17. The apparatus of claim 15, wherein the connection signature includes information selected from the group consisting of information identifying data to be accessed by the task, information identifying data types to be accessed by the task, information identifying a user from which the task is requested, information identifying an application from which the task is requested, information identifying another computer system from which the task is requested, information identifying a network from which the task is requested, information identifying a device from which the task is requested, information identifying a computing operation for which the task is to perform, information identifying an alert that induces the task, and information identifying an alarm that induces the task, and wherein the program code is further configured to compare the identified data for the connection signature with data identified in the information associated with the pre-started job.

18. The apparatus of claim 15, wherein the program code is further configured to reallocate an incompatible pre-started job to perform the task as the compatible pre-started job.

19. The apparatus of claim 15, wherein the program code is further configured to determine the compatible pre-started job by selecting a pre-started job from among the plurality of pre-started jobs that executes on a processing node with data in the processing node memory that can be utilized to perform the task.

20. The apparatus of claim 15, wherein the program code is further configured to select the compatible pre-started job based at least in part on the length of time the compatible pre-started job has been performing tasks on the computer system.

21. The apparatus of claim 15, wherein the program code is further configured to select the compatible pre-started job based at least in part on the number of times the compatible pre-started job has been accessed to perform tasks on the computer system.

* * * * *